Aug. 15, 1967  C. H. HELBING  3,336,185
BONDED GLASS FIBER PRODUCT AND PROCESS OF PREPARING SAME
Original Filed Dec. 3, 1963
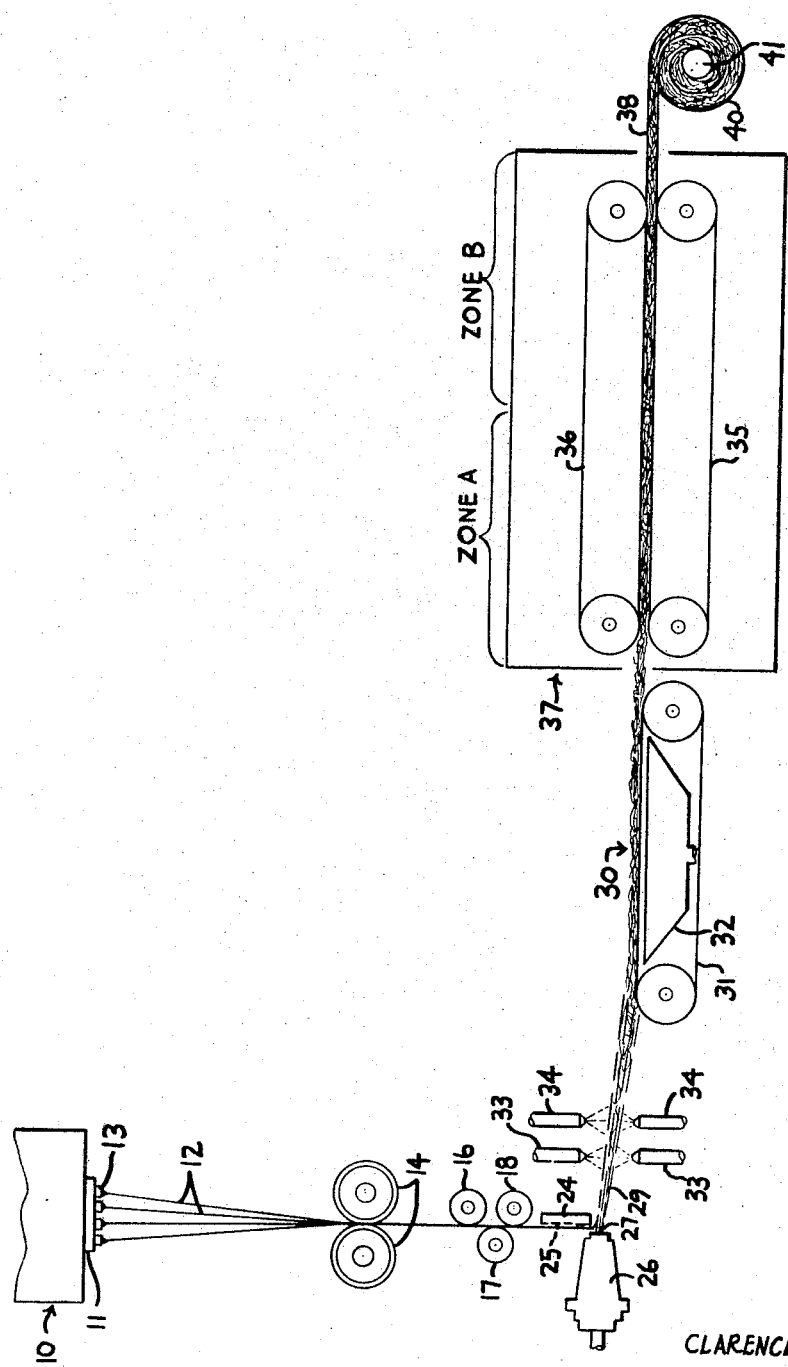
INVENTOR.
CLARENCE H. HELBING
BY
ATTORNEYS

United States Patent Office 3,336,185
Patented Aug. 15, 1967

3,336,185
BONDED GLASS FIBER PRODUCT AND
PROCESS OF PREPARING SAME
Clarence H. Helbing, Shelbyville, Ind., assignor to Pittsburgh Plate Glass Company, Pittsburgh, Pa., a corporation of Pennsylvania
Continuation of abandoned application Ser. No. 328,158, Dec. 3, 1963. This application Mar. 18, 1966, Ser. No. 535,492
8 Claims. (Cl. 161—170)

This application is a continuation of application, Ser. No. 328,158, filed Dec. 3, 1963, now abandoned.

This invention relates to composite glass fiber articles containing significant amounts of a thermosetting resinous composition prepared by initially reacting phenol and formaldehyde to the A or B stage of condensation, and then adding crystalline (monomeric) urea, a water-soluble liquid A state urea-formaldehyde condensate and ammonium lignosulfonate followed by the addition thereto of a suitable curing catalyst or catalysts, e.g. hexamethylene tetramine, to speed curing of the composite resinous composition.

The articles produced according to the present invention contain glass fibers and the aforementioned synthetic resin thermo-setting binder. These articles range in density from one-eighth pound per cubic foot to about 20 pounds per cubic foot, with the lower density products having utility for insulation purposes and the like and the high density products having utility as structural boards and the like.

It is an object of this invention to provide composite glass fiber, resinous articles characterized by a binder composition having outstanding resistance to punking and combustion coupled with excellent moisture resistance when the binder composition is advanced to its cured state. Furthermore, the binder compositions employed herein afford better handling of the uncured binder impregnated insulation during processing thereof than has been heretofore obtainable. Also the binder compositions of this invention can be cured using higher curing temperatures without discoloration of the binder. Moreover, the present invention affords the attainment of better rigidity and water resistance than heretofore securable.

A further object of the present invention is the preparation of glass fiber-resin composite insulation articles which are economical in nature, and wherein the binder component thereof is less expensive than the glass fibers themselves.

Other objects and advantages of the present invention will appear hereinbelow from the following description.

The invention will be more fully understood by reference to the following detailed description and accompanying schematic drawing wherein a single figure illustrates a preferred embodiment of the present invention.

Referring to the drawing there is shown at 10 a pot of molten glass from which primary fibers 12 are attenuated from bushing 11 through orifices 13 by drawing rolls 14 which can be driven by any suitable means. The primary fibers 12 pass between guide rolls 16, 17 and 18 and over the grooved surface 25 of guide plate 24. At the lower end of plate 24, the fibers 12 feed into a high speed gaseous blast 29 issuing directly from the discharge slot 27 of a high velocity gas burner 26 onto the ends of the primary fibers 12. The blast is so intensely hot that as the fibers move into the blast they are melted and the molten glass is drawn out by the force of the blast into fine glass fibers.

The fibers attenuated and blown by the gaseous blast are collected at 30 on a foraminous moving belt 31 with the assistance of a vacuum system, a portion of which is indicated at 32. The illustrated collective equipment and the power means therefor are conventional and accordingly are not set forth in detail in the schematic illustration.

Before the fibers are collected and moved laterally in the direction indicated by the arrows, they are sprayed first with water from spray heads 33 and then with the phenol formaldehyde-crystalline urea ammonium lignosulfonate-liquid A stage urea-formaldehyde condensate aqueous binder solution of the present invention from spray heads 34. The phenol formaldehyde-crystal urea-ammonium lignosulfonate-liquid A stage urea formaldehyde condensate aqueous binder solution employed in this invention exhibits tacky properties which yield enhanced adhesion of the binder to glass fibers. Moreover, the viscosity of the binder is sufficiently high at the time it is applied to the glass fibers to aid in preventing the binder from being drawn off along with the water when the suction is applied, e.g., by vacuum system 32. The water spray from spray heads 33 helps in localizing the fiber feed and compacting them on forming belt 31. The water from spray heads 33 also helps to prevent precure of the binder by cooling the burner blast. The resinous composition of the present invention is preferably applied from an aqueous system, viz., an aqueous solution or dispersion. However, other solvent systems can be used, e.g., an ethyl alcohol organic solvent or any organic solvent which is soluble in or readily miscible with water. An aqueous solvent system is preferred.

The water can be readily dried from the fibers in the course of their travel along the conveyor system. Some water is removed by the suction means. Most of the water is removed by evaporation due to heat produced by the gas burner 26. Of course, other heating devices, e.g., radiant heat lamps can also be used for this purpose. The fine fibers are conveyed from collecting belt 31 onto lower foraminous belt 35 which coacts with upper foraminous belt 36 to compress the resin-impregnated fibers to any desired degree. The fibers are carried between belts 35 and 36 through drying and curing oven 37, which has a lower temperature Zone A and a higher temperature Zone B. Both belts 35 and 36 can be set to define the thickness of the resin bonded glass fiber insulation material passing therebetween. This is done by conventional means (not shown) such as spring biasing the rollers upon which the conveyor belts are mounted by biasing springs against the central shaft mountings of the conveyor driving rollers.

The web or board 38 of glass fibers, coated and impregnated with the resinous composition containing the polymeric network of phenol-formaldehyde condensate-crystalline urea-ammonium lignosulfonate-liquid A stage urea formaldehyde condensate advanced to a cured state can be passed from the conveyor system to form a reel 40 comprising the glass fiber web 38 wound around a centrally located shaft 41. If the resin impregnated continuous glass fiber mat is to be used to make a relatively high density insulation product and exists in "board" form as it passes from the conveyor system, the glass fiber board instead of being wound up on a reel can be passed immediately to suitable cutting and/or slitting devices (not shown). Also, prior to or following the cutting thereof the glass fiber insulation board can be laminated to a base sheet, such as a heat resistant plastic sheet, metal foil or fabric which can serve as an ultimate facing sheet therefor when the insulation board is installed in place.

The fine, attenuated glass fibers can be formed using horizontal gaseous blast technique such as indicated and shown in U.S. Patent No. 2,489,243, or can be formed by the flame centrifugal and steam centrifugal processes as indicated in U.S. Reissue Patent No. 24,708 and U.S. Patent No. 2,949,632, respectively.

It will be manifest that the thickness of the fibrous layer will depend chiefly upon the rate of feed of molten glass, the number of orifices in the fiber forming system, the rate of linear travel of the normally endless collecting belt conveyor system and the height between vertically adjustable conveyor belts 35 and 36.

In the past, phenol-formaldehyde resins have constituted the principal binding agent for glass fibers. Phenol-formaldehyde binder materials are usually applied either in an unpolymerized, or initially polymerized, viz., A stage, or intermediate stage, viz., B stage, of polymerization. They are subsequently advanced to a cured stage upon activation by heat and/or catalyst with or without the application of pressure for densification of the composite mass into a board or molded form.

The phenol-formaldehyde reaction is exothermic, that is, heat is given off by the reaction of phenol and formaldehyde to the resinous or C stage of polymerization. It is conceivable, then, that the exothermic reaction will continue in the vicinity of an accidentally included hot spot in the glass fibers (viz., an accidentally included molten gob of glass) to a point far beyond that which is contemplated in the manufacturing process. In view of the fact that the surrounding glass fibers constitute excellent heat insulation, the heat of the gob and the heat given off by the reaction will become cumulative within a confined area until such temperatures are obtained as will cause thermal decomposition of the organic resin, thus forming various decomposition products, including vapors which may have an ignition temperature corresponding to the temperature of the surrounding medium. When this condition is reached, the vapors will burst into flame and conflagration will spread to the surrounding area. The quiescent stage before actual ignition is hereinafter referred to as "punking." It may last for a considerable length of time with the result that the ignition of the entire shipment or load may occur in a warehouse.

In an attempt to eliminate these dangerous and costly mishaps, adhesives have been formulated in which urea formaldehyde resins replace all or the greater portion of the phenol formaldehyde resins. In certain phases improvement has been secured, but binder compositions based on urea formaldehyde resin have many of the same and additional objectionable characteristics. For example, they do not have adequate moisture resistance for all insulation uses of the bonded glass fiber materials, especially when the bonded insulation is to be of high density and subjected to corrosive salt water atmospheric conditions and spray, e.g., as in "Navy Hull Board." Moreover, because of the comparatively uncontrollable rapid curing characteristics of the urea formaldehyde resin, it is difficult to make use of the resinous material as a binding agent and at the same time secure uniform distribution thereof in the glass fiber mat.

Moreover, it is customary in preparing prior art glass fiber resin-impregnated insulation materials to minimize the amount of resinous binder which is employed to thereby secure economic savings. In most prior art resin-impregnated glass fiber mats, the resinous binder costs more than the glass fibers themselves. However, the use of minimal concentrations of binder results in reduced mechanical properties whereas in general the use of higher concentrations of binder results in better mechanical properties.

However, according to the present invention, the weight concentration of binder can be as high as 40 percent of the total weight of binder and fibers and in some cases even higher. This is the case because the binder composition employed according to the present invention is generally less expensive than the prior art binder compositions due to the ability to include significant amounts of crystalline urea and ammonium lignosulfonate, both of which are less expensive than phenol-formaldehyde resin.

Therefore, there is derived in addition to the advantages mentioned above a double benefit from the use of applicant's invention, viz., (1) the ability to secure advantageous mechanical properties in the resin-bonded glass fiber mats and boards as well as (2) substantial economic savings due to the relatively inexpensive nature of applicant's binder composition.

In accordance with this invention, there is provided a bonded glass fiber product and method for production thereof wherein the binder comprises in its solid (non-aqueous) content: 70 to 100 percent by weight of total polymer component and 0 to 30 percent by weight of adjuvant materials along with sufficient pH control agent, e.g., ammonium hydroxide, to maintain a pH ranging from 7 to 11 and preferably 7 to about 9. The total polymer component is comprised of 10 to 35 percent by weight of monomeric crystalline urea in solid or liquid form, 50 to 85 percent by weight of an A or B stage phenol formaldehyde condensate, 5 to 30 percent by weight of ammonium lignosulfonate and 3 to 25 percent by weight of a liquid A state urea-formaldehyde condensate. The adjuvant materials, when included, are from 0 to 20 percent by weight of binder solids of wet concentrated ammonium hydroxide as a pH control, from 0 to about 10 percent by weight of a catalyst material or materials, from 0 to about 10 percent by weight of a lubricant material, and from 0 to about 10 percent by weight of a silane coupling agent. Of course, other adjuvant materials, e.g., pigments, dyes, coloring agents, etc., can also be included.

While these adjuvant materials can be omitted, it is sometimes preferable to include them in the binder, depending on final properties desired.

The remainder of the binder composition (aqueous content) comprises water with the weight ratio of the solids (non-aqueous) content to the water ranging from about 0.083 to 4.2:7.

The weight percentage of the non-aqueous components to the total weight of the binder formulation can range from about 1 to about 50 weight percent with the preferable range of solid non-aqueous components being from 2 to about 30 percent. Most preferably the non-aqueous components constitute about 8 to 25 percent by weight of the total aqueous binder composition.

As used herein, the term "glass fibers" is intended to include glass fibers of the type produced by the attenuation of molten streams of glass by blasts of high pressure steam or air directed angularly downwardly or perpendicularly onto the molten streams as they issue from a glass melting device, such as pot 10 shown in the drawings. A more detailed showing of the production of such continuation glass fibers is shown and described in Slayter et al., Patent No. 2,206,058, or in the Simison et al. Patent No. 2,189,840. Preferably, use is made of very fine glass fibers which are formed by gaseous burner blast blown systems such as shown in the accompanying drawing. In addition to the very fine fibers, glass fibers capable of use in practice of this invention can be prepared from continuous glass fibers cut or chopped to shorter lengths; or use can be made of continuous glass fibers and yarns of endless lengths which are deposited in swirl patterns or in haphazard fashion (random array) and the like. Such continuous fibers may be used alone or in combination with staple type glass fibers in the formation of mats and boards for use with thermosetting binders in the manufacture of insulation products.

The phenol formaldehyde A or B stage condensates employed to form the binder composition employed in the present invention are represented by the conventional phenol formaldehyde A and B stage condensation products used in the manufacture of bonded insulation products or molded products. Use can be made of a phenol formaldehyde condensate advanced to an A (water-soluble) stage; or use can be made of phenol formaldehyde condensates advanced to a B (water dispersible) stage;

or the phenol formaldehyde condensation product can be a mixture of an A stage and a B stage phenol formaldehyde condensate.

The phenol formaldehyde condensation product can be produced according to conventional condensation procedures using either one stage synthesis using a basic catalyst or a two stage synthesis using an acid catalyst. The ratio of formaldehyde to phenol can vary considerably, e.g., from 0.9 to 4.0 to 1. However, it is preferable to employ an excess of formaldehyde over and above stoichiometric molar amounts. Thus, for example, the formaldehyde to phenol molar reaction ratio can range from about 1.0 to 3.0:1.

The ammonium lignosulfonate components can be ammonium lignosulfonate, per se, or it can be an ammonium lignosulfonate containing product derived by the ammonia base wood pulping process. Since the latter material is commercially available at less cost than pure ammonium lignosulfonate, its use is generally preferred. Such a commercially available product is "Orzan A" which is a free-flowing powder constituted chiefly of 40 to 70 percent by weight (dry basis) ammonium lignosulfonates plus 10 to 40 percent by weight wood sugars derived from the pulping of wood by the ammonia-base process. The preparation of this material is described more fully at column 2, lines 29–68 and elsewhere in U.S. Patent 2,786,008. Another reason why the use of ammonium lignosulfonate products derived by the ammonia base wood pulping process are generally preferred is that these materials contain wood sugars which condense with ammonium lignosulfonate at elevated temperatures employed in drying and curing the binder thus forming increasingly larger molecules. This promotes an increase in binder viscosity and assists in retaining the binder on the fibers during removal of the water therefrom.

Usually the ammonium lignosulfonate component constitutes from about 5 to 30 percent by weight of total polymer component. Conveniently the weight percentage of the ammonium lignosulfonate component ranges from 5 to 15, and preferably from 10 to 15 percent by weight based on total polymer component.

The liquid water-soluble A stage urea formaldehyde condensate component is prepared by reacting a molar excess of formaldehyde with urea. An example of one such condensate is the commercially available "Tybon 5711–F" manufactured by Pacific Resins and Chemicals, Inc. The liquid water-soluble A stage urea formaldehyde condensate component can constitute from about 3 to 25 percent by weight of the total polymeric component in the binder. Usually the weight percent of the liquid water soluble A stage urea-formaldehyde condensate ranges from 2 to 10 percent, and more preferably from 2 to 5 percent based on total polymeric component.

The urea component is monomeric crystalline urea, which can be employed in solid form as granules or pellets or can be dissolved in water (liquid form) and added to the aqueous system containing the phenol-formaldehyde condensate. The weight percentage of crystalline urea based on the total polymeric component of the binder usually ranges from about 10 to about 35 percent by weight of the total polymeric component. Conveniently the weight percent of urea in the polymeric component ranges from 15 to 25 percent by weight. Preferably, the weight percentage of crystalline urea ranges from about 18 to 22 percent of the total polymeric component of the binder. Usually at least 20 percent by weight of the total polymer content is crystalline urea.

An oleaginous lubricant and processing aid can be employed in the binder composition in order to lubricate the glass fibers as they are being formed into insulation boards or mats. A suitable lubricant material for use in accordance with the present invention is "Tybon Dark Oil," a product of Pacific Resins and Chemicals, Inc. "Tybon Dark Oil" is a chemically modified, high-flash, water-soluble, high-viscosity mineral oil which is in emulsion form without requiring the use of additional dispersing agents or wetting agents, and has a solids content of approximately 45 percent by weight. "Tybon Dark Oil" has a weight per gallon of 8.0 pounds, a flash point (open cup) of 600° F. and a freeze-thaw resistance which is good after 10 cycles.

Another class of adjuvant materials which can be included in the binder are silane coupling agents. Especially preferred silane materials are those which not only function as a coupling agent but also serve as a lubricant and wetting agent. Amino-alkyl trialkoxy silanes constitute the preferred class of silane materials with gamma-aminopropyl triethoxy silane being the aminoalkyl trialkoxy silane of choice. Gamma-aminopropyl triethoxy silane is available under the trade names "A–1100" and "Silcone A–1100," and can be used either alone or in admixture with "Tybon Dark Oil" or other lubricants. The silane material can be employed in amounts ranging from 0 to about 10 percent by weight of the nonaqueous component. When a silane material is employed, the preferable weight concentration ranges from 0.2 to 2 percent by weight of the solid (non-aqueous) component of the binder.

Another adjuvant material which can be included in the binder is a catalyst or catalysts to advance the phenol formaldehyde and urea formaldehyde condensates to the advanced or C stage of condensation, and the catalyst can constitute from 0 to about 10 percent by weight of the non-aqueous component of the binder. If time is not a significant factor in preparing the products, the catalyst can be omitted. Usually, however, it is desirable to include a condensation (polymerization) catalyst to accelerate conversion of the phenolformaldehyde A or B stage condensate and the urea formaldehyde A stage condensate to the C stage of polymerization. As suitable condensation catalysts the following materials can be listed as exemplary of those which can be employed for this purpose in conjunction with this invention: ammonium chloride, ammonium sulfate, ammonium nitrate, ammonium bromide, ammonium iodide, ammonium fluoride, etc. Mixtures of any two or more of the above catalysts can also be used. Ammonium chloride and ammonium sulfate are the catalyst materials of choice.

In addition to the above-mentioned catalyst, an optional heat hardening (curing) catalyst, e.g., hexamethylene tetramine, can be employed to assist in heat setting the phenol-formaldehyde condensate to the water and solvent-insoluble stage. This curing catalyst can be initially dissolved in the aqueous binder, and applied along with the binder, e.g., by the spraying devices 34 as shown in the drawing; or it can be separately sprayed onto the glass fibers after the fibers have been impregnated with the binder and as they are being formed into a mat. Preferably, however, the curing catalyst is included in the aqueous binder formulation and applied by spraying when it is used. In this manner it is possible to secure more uniform distribution of the curing agent in the glass fiber mat.

When a catalyst or catalysts are included, the combined weight of catalyst material ranges from 0.5 to 10 percent by weight of the non-aqueous component of the binder. Preferably the curing agent is employed in amounts ranging from 0.5 to about 2 percent by weight of the total polymeric component.

After the binder formulation is applied, the glass fiber mat containing the binder uniformly impregnated therein is subjected to a combined drying and curing operation by passing it between upper belt 36 and lower belt 35. Heat is supplied by any suitable heat sources such as overhead gas burners via forced gas heat. One of the ancillary advantages of the present invention is that the drying of the binder and the curing thereof onto the glass fibers can be accomplished comparatively rapidly in one time-saving, simple operation. Of course, heat can be applied to the insulation mat from the bottom side also, and various combinations of both upper and lower heating schemes can be used. Generally, when drying and curing are done together, the combined operation will be conducted at temperatures ranging from about 300° F. to 600° F. with the more preferable temperature range being from about 375° F. to 475° F. During the combined drying and curing operation, substantially all of the water is evaporated from the binder formulation leaving essentially a solid binder on the glass fibers. The time involved for curing will depend among other factors upon the specific type of apparatus employed to effect curing. For example, if a forced air heating system is used, the curing time will depend upon the volume and speed of the forced gas or air used for heating. Other factors include the thickness of the glass fiber mat and the resin content therein.

The glass fibers within the board or mat can be compressed to any desired density merely by regulating the distance between upper belt 36 and lower belt 35, and regulating the speed of movement of the fiber collecting belt 31. Instead of compressing the glass fibers between belts 36 and 35 and curing them immediately after the formation of the mat in conjunction with the drying procedure, the glass fiber mat can be loosely formed on belt 31, dried to remove a substantial amount of the water content, and then placed into a mold of any desired shape and cured during the molding operation to yield glass fiber insulation products having various shapes, contours and configurations. For example, when making pipe insulation, it is convenient to first form a mat of a low density and then place the resin-bonded mat into a mold, wherein the shaping and final curing of the phenol-formaldehyde-crystalline urea-ammonium lignosulfonate-urea formaldehyde condensate polymeric network takes place while the glass fibers are being compressed to the desired density during the molding operation. This curing in situ in the mold can be conducted rapidly while molding pipe insulation. For example, at a temperature of 475° F., a thickness of one inch, a density of 3.5 pounds per cubic foot, and a binder content of approximately 12 percent by weight (based on the total weight of glass fibers and binder), a molded glass fiber pipe insulation product can be cured readily in a time period ranging from about 100 to about 300 seconds with 9 to 11 inches of water static pressure.

The weight percentage of binder formulation based on combined weight of glass fibers and binder in the dry, thermoset (cured) resin-bonded glass fiber products of the present invention can range from about 2 to about 40 percent with the preferred percentage of binder ranging from about 8 to about 35 percent by weight. The specific weight percentage of binder based on the combined weight of binder and glass fibers will depend on the ultimate use of the product. For low density products the preferred weight percentage of binder ranges from about 15 to 20 percent. For high density products the preferred weight percentage of binder ranges from about 8 to 35 percent. The term "low density" as used herein refers to products having densities of up to and including about 2.5 pounds per cubic foot, whereas the term "high density" refers to products having densities above about 2.5 pounds per cubic foot.

While other non-urea polymeric materials can be used in combination with the phenol-formaldehyde condensate and ammonium lignosulfonate component to constitute the total non-urea content of the total polymeric component, it is by far preferred both from a cost standpoint and as regards facility in processing that at least 50 percent of the non-urea content of the polymeric component of the binder be constituted of phenol-formaldehyde condensate and ammonium lignosulfonate preferably employed essentially in 7:1 ratio. The benefits of the present invention are obtainable to the fullest extent when using 70 percent and preferably 75 to 100 percent by weight of said materials as the polymeric non-urea containing component in the binder.

The expression "non-urea content of the total polymeric component" and similar terms as used herein are intended to designate that portion of the polymeric component which does not contain urea either in monomeric form or condensed with formaldehyde.

*Example 1*

Glass fiber pipe insulation and mat insulation products of both low and high densities have been produced within the purview of this invention by impregnating glass fibers with an aqueous binder composition varying in solids (non-aqueous) content from 8 to 20 percent and containing as a non-aqueous component: 20 percent by weight crystal urea; 64 percent by weight of an A stage phenol-formaldehyde condensate prepared by reacting a molar excess of formaldehyde with phenol; 10 percent by weight "Orzan-A," an ammonium lignosulfonate wood sugar containing product derived from the ammonia base wood pulping process; 3 percent by weight of a water-soluble A stage liquid urea-formaldehyde condensate, prepared by reacting a molar excess of formaldehyde with urea and available commercially under the trade name "Tybon 5711–F"; 2 percent by weight of "Tybon Dark Oil"; and 1 percent by weight of ammonium sulfate catalyst; with the remainder being water.

In order to form 125 gallons of the aqueous binder composition, fifty gallons of soft water are placed in a mixing tank equipped with a mechanical agitator of the propeller type. The agitator is started and 18.1 pounds of crystal urea is added to the tank. The liquid urea-formaldehyde condensate "Tybon 5711–F," 6.0 pounds, is then added. Then the ammonium lignosulfonate composition "Orzan A," 9.1 pounds is added slowly with continued mixing until it is completely dissolved. Thereafter, 9.2 gallons of the liquid phenol-formaldehyde condensate is added followed by the addition of one gallon of ammonium hydroxide and 4.0 pounds (0.5 gallon) of the lubricant "Tybon Dark Oil." Then the remainder of the water is added to bring the aqueous solution to a total volume of 125 gallons. Following this, 411.3 grams of the catalyst, ammonium sulfate is added to complete the preparation. Various pH determinations performed on one quart samples of this aqueous binder composition reveal a pH of 8.0, plus or minus 0.5. The pH of the aqueous binder is maintained basic during the preparation thereof since at pH levels significantly below 7.0, e.g., 5.0 the binder is somewhat degraded by physical separation of the phennol-formaldehyde and urea-formaldehyde components from remainder of the aqueous binder composition.

Mat samples are formed in the manner discussed previously hereinabove in conjunction with the attached drawings and impregnated with the binder composition, followed by drying and curing of the binder for 30 minutes at 300° to 350° F. to form cured insulation mats. These cured insulation mat samples, having a density of 3 pounds per cubic foot and a thickness of 2 inches, are then subjected to "smolder and punking resistance" tests. A hot, cherry red rivet (1450° F.) was placed between the top and bottom 2-inch thick pad. The assembly was placed in a draft-free box. The top piece was removed after one hour elapsed. If there was no smoke or smoldering, the sample passed the smolder test. The patch of completely burned out area (white) and the charred (black) areas were measured. These were compared to rate the degree of punk resistance of the samples.

The fire resistance test is conducted using representative half sections of molded pipe insulation specimens having 36 inch length. The purpose of this test is to determine the extent of punking or combustion propagation of molded pipe insulation after being subjected to spot contact for 10 minutes with a high temperature, 1/8 inch cone blue-bearded laboratory Fischer burner flame. The "fire resistance" test is conducted by placing the half section of pipe insulation convex surface downward in a clamping device allowing free access of the Fischer burner flame for a distance of approximately 7 inches on either end of the specimen. The Fischer burner is then lit and the flame cone adjusted to a height of 4 to 5 inches above the grid of the burner until the blue-bearded flame cones to a steady uniform height of approximately ⅛ inch above the grid of the burner. Then the lighted burner is centered approximately 6 inches from one end of the specimen with the burner grid approximately 2½ inches below the lower surface of the test specimen. The lighted burner is removed from the igniting position at the end of 10 minutes. Then the specimen is unclamped and stood in a vertical position immediately with the ignited end downward, and allowed to remain in this position for 50 minutes. At the end of the 50-minute period, the specimen is cut down the center lengthwise. The distance from the non-ignited end to the nearest burned-out point is measured to the nearest ¹⁄₁₆ inch and recorded. This distance is then subtracted from 30 inches to yield the distance in inches which constitutes the extent of punking or combustion propagation.

The glass fiber product containing the binder of the present invention shows good rating both for fire resistance and punking resistance (approximate average combustion propagation of 2 inches) when subjected to the above-noted tests.

The binder composition of the example is tenaciously adherent to the glass fibers.

Pipe insulation product are formed by removing the glass fiber binder impregnated mat from forming belt 31 and molding in a conventional pipe insulation mold into cylindrical pipe approximately 40 inches long. The cured insulation is trimmed to 36 inches in length. The uncured binder impregnated mats exhibit drier properties and are more self sustaining in shape (stiffer) than mats impregnated with binders containing no ammonium lignosulfonates, which latter mats are flimsy and difficult to handle and process for curing. The binders according to this invention show fine integrity of shape in the uncured state and are easy to handle and process for curing. These mats sometimes will be so dry that they will unwrap as soon as they reach a point where the mat is not held by the transfer machinery. It has been found that steam will soften the mat and condition it so that the dry mat will become flexible and will not unwrap. Steam also increased the loft of the mats. In practice steam is passed through apparatus to separate water and condensate and the dry steam is applied to the mat from a distributor. The distributor is a ¾ inch pipe with approximately ⁵⁄₃₂ inch diameter holes drilled on one inch centers. The distributor is held about 4 inches above the mat. The steam is applied to the mat as it travels between the cutter and the wrap-up apparatus.

The moisture resistance of the samples is determined by subjecting the samples to a boil test and a humidity breakdown test.

The boil test involves totally immersing the cured insulation samples into boiling water for a period of 4 hours followed by removal from the water. After drying, the sample is considered satisfactory if (A) no substantial change is evidenced in the shape of the sample and (B) no delamination occurs. The humidity breakdown test is conducted by subjecting the cured insulation samples to seven 24-hour exposure cycles of 95 percent relative humidity in a sealed humidity cabinet in which the temperature is varied from 0 to 150° F. over each 24 hour cycle. The insulation products of Example I passed both moisture resistance tests.

*Example II*

The following represent another formulation which is suitable for practicing the invention.

| Ingredient: | Percent by weight |
| --- | --- |
| Phenol formaldehyde condensate | 54 |
| Crystalline urea | 23 |
| "Orzan A" | 10 |
| Tybon 5711–F | 10 |
| Tybon Dark Oil | 2 |
| Ammonium sulfate | 1 |

Instead of coating and/or impregnating the binder formulation onto the glass fibers by spraying, as shown in the accompanying drawing, the glass fiber mat can be impregnated with the binder formulation by any of the conventional coating and/or impregnating techniques known in the art. For example, the binder can be applied by a flow-coating procedure or by immersion of the glass fiber mat into a bath containing the aqueous binder composition. In such cases, the binder formulation is allowed to drain from the glass fiber base; and where rapid drainage is desired, suction means such as suction device 32 can be employed. The binder formulation can be allowed to air dry, but it is preferred to employ heat and suction in conjunction with the drying thereof due to the extended period of time required when using ambient drying temperatures.

However, sometimes it is desirable to delay curing, e.g., while the material is stored prior to molding into pipe insulation or other form. For such a purpose the binder composition of this invention displays admirable shelf-life and storeability. For example, glass fiber mat impregnated with the binder of this invention can be removed from forming belt 31 and stored safely at 50 percent relative humidity and at a temperature of 70° F. for two weeks while avoiding self-curing. The binder impregnated articles of this invention can be stored for even longer periods without curing by storage at below room temperature, viz., temperatures ranging from 60° F. to 32° F. and even lower.

The moisture resistance, punking resistance and fire resistance properties of the glass fiber insulation products produced according to the present invention can be attained with the use of short curing periods. This enables insulation products to be produced rapidly which products possess an overall (composite) balance of complementary advantageous properties.

The crystalline urea apparently becomes a part of the resin system of the binder. It may be assumed that the urea actually is chemically bound in the resin perhaps by forming a four membered condensation polymer with the partially condensed phenol-formaldehyde condensate, urea-formaldehyde condensate and ammonium lignosulfonate component perhaps cured in part by urea bridges into a three dimensional polymeric network. Of course, applicant is not bound by this or any other theory concerning the chemical reaction(s) occurring in the binder formulation when the binder is cured in situ upon the glass fibers. It should be understood here that the present invention is not necessarily dependent for its operation and advantageous results upon this or any other theory.

The entire role of the ammonium lignosulfonate component is not completely understood, and it may contribute to the achievement of many of the advantageous properties. The inclusion of the ammonium lignosulfonate component is known to upgrade the handling and processing properties of the uncured insulation as well as increasing the stiffness of the cured insulation products and hence the workability (cutting properties) thereof. Also, the inclusion of the ammonium lignosulfonate enables the curing to be done at high temperatures over short time periods without binder discoloration.

The presence of small amounts of liquid urea-formaldehyde condensate promotes reaction of the monomeric crystal urea into the resin system and thus reduces vaporization losses thereof and at the same time increases the resistance to punking and smoldering.

The binder compositions employed in this invention yield glass fiber insulation products having several advantageous properties not secured by use of a mixture consisting of a previously condensed phenol-formaldehyde resin and a previously prepared urea-formaldehyde resin, which mixture is then cured in situ on the glass fibers. For example, the products of this invention have better moisture resistance and can be cut easier than insulation products using a binder formed by curing a mixture of phenol-formaldehyde and urea-formaldehyde condensates. In addition, even with the curing catalyst present, the binder employed in this invention is more resistant to precuring at ambient atmospheric conditions than phenol-formaldehyde urea-formaldehyde mixed condensates containing a curing catalyst; hence, the instant binder compositions have better shelf life and the glass fiber insulation products impregnated therewith can be stored for a longer period without curing.

Also, the binder compositions of this invention can be worked (cut) much easier than insulation products containing a binder which consists of a mixture of previously prepared phenol-formaldehyde and melamine-formaldehyde condensates advanced to a cured state and possess fire resistance, punking resistance (for pipe insulation) and smolder resistance superior thereto.

Compared to insulation products containing a phenol-formaldehyde-crystal urea binder, the insulation products of this invention exhibit improved dry and wet tensile strengths after curing. Moreover, the glass fiber insulation of this invention is easier to process and handle in the uncured state than the comparatively limp uncured insulation products containing a binder of phenol-formaldehyde and crystal urea but without ammonium lignosulfonate and liquid urea-formaldehyde condensate.

In practice, insulation products molded and/or bonded with the binder compositions described herein are capable of use under elevated temperature conditions without significant "punking" or thermal deterioration, and the cured products are also capable of use under moisture or high humidity conditions without excessive swelling or moisture absorption. Moreover, the insulation products prepared according to the present invention display excellent fire and punking resistance and offer good working properties so that they can be readily cut and installed in place on the job site without requiring special, expensive cutting machinery.

The resin-bonded glass fiber products of the present invention can be used for other purposes than insulation although acoustical and thermal insulation are by far the foremost commercial utilities thereof. For example, the articles of this invention can be used as railroad insulation; upholstery padding for furniture; packing material for shipping purposes; various fire-resistant decorative uses, e.g. padding for Christmas tree ornaments; etc.

While the invention has been illustrated in detail in the foregoing specification, it should be realized that the invention in its broadest aspects is not necessarily limited to the particular formulations, curing conditions, densities and binder concentrations set forth in the examples.

I claim:

1. A method of preparing a bonded glass fiber product which method comprises the steps of:
    forming glass fibers;
    impregnating the glass fibers with a heat curable binder composition comprising the combination of:
        (a) 50 to 85 percent by weight of a phenol-formaldehyde condensate,
        (b) 4 to 40 percent by weight of crystal urea,
        (c) 2 to 30 percent by weight of an ammonium lignosulfonate component constituted chiefly of a major amount of ammonium lignosulfonates and a minor amount of wood sugars,
        (d) 0.1 to 15 percent by weight of a liquid urea-formaldehyde condensate,
        (e) 0 to 5 percent by weight of a lubricant, and
        (f) 0 to 5 percent by weight of a curing catalyst consolidating the fibers into a loosely packed structure; compressing the impregnated glass fiber structure; and curing said heat curable binder composition in situ on the glass fibers.

2. The method of claim 1 wherein the said steps of compressing and curing are conducted simultaneously.

3. The method of claim 1 wherein the said binder is applied from an aqueous system.

4. The method of claim 3 wherein the curing is accomplished by the application of heat at temperatures ranging from 300° F. to 600° F. for a time period sufficient to cure the binder.

5. A bonded product formed of glass fibers and a heat curable binder securing the fibers together in a comparatively porous structure wherein the heat curable binder comprises the combination of:
    (a) 50 to 85 percent by weight of a phenol-formaldehyde condensate,
    (b) 4 to 40 percent by weight of crystal urea,
    (c) 2 to 30 percent by weight of an ammonium lignosulfonate component constituted chiefly of a major amount of ammonium lignosulfonates and a minor amount of wood sugars,
    (d) 0.1 to 15 percent by weight of a liquid-urea-formaldehyde condensate,
    (e) 0 to 5 percent by weight of a lubricant, and
    (f) 0 to 5 percent by weight of a curing catalyst,
the total weight percent being 100 percent, and wherein the weight concentration of said binder in the product ranges from about 2 to about 40 percent based on the combined weight of glass fibers and binder.

6. A punking-resistant, fire-resistant, moisture-resistant, readily workable, bonded glass fiber insulation product which comprises the bonded product of claim 5 wherein the binder is advanced to a cured state.

7. A heat curable aqueous binder composition comprising an aqueous component and a non-aqueous component, said non-aqueous component comprising:
    (a) a phenol-formaldehyde condensate,
    (b) crystal urea,
    (c) ammonium lignosulfonate,
    (d) a urea-formaldehyde,
    (e) a lubricant, and
    (f) a curing catalyst.

8. A heat curable aqueous binder composition comprising 70 to 98 percent by weight of water and 2 to 30 percent by weight of a non-aqueous component, said non-aqueous component comprising:
    (a) 50 to 85 percent by weight of a phenol-formaldehyde condensate,
    (b) 4 to 40 percent by weight of crystal urea,
    (c) 2 to 30 percent by weight of an ammonium lignosulfonate component constituted chiefly of a major amount of ammonium lignosulfonates and a minor amount of wood sugars,
    (d) 0.1 to 15 percent by weight of a liquid urea-formaldehyde condensate,
    (e) 0 to 5 percent by weight of a lubricant, and
    (f) 0 to 5 percent by weight of a curing catalyst.

References Cited

UNITED STATES PATENTS

| | | | |
|---|---|---|---|
| 1,844,571 | 2/1932 | Goldschmidt | 260—51.5 |
| 2,849,314 | 8/1958 | Goss | 162—163 |
| 3,215,585 | 11/1965 | Kneipple. | |

DONALL H. SYLVESTER, *Primary Examiner.*

S. LEON BASHORE, *Examiner.*

R. L. LINDSAY, *Assistant Examiner.*